US011780993B2

(12) United States Patent
Watanabe et al.

(10) Patent No.: US 11,780,993 B2
(45) Date of Patent: Oct. 10, 2023

(54) NBR COMPOSITION FOR RUBBER LAMINATED METAL

(71) Applicant: NOK CORPORATION, Tokyo (JP)

(72) Inventors: Isao Watanabe, Kanagawa (JP); Daiki Takekawa, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 458 days.

(21) Appl. No.: 16/764,514

(22) PCT Filed: Oct. 16, 2018

(86) PCT No.: PCT/JP2018/038506
§ 371 (c)(1),
(2) Date: May 15, 2020

(87) PCT Pub. No.: WO2019/102747
PCT Pub. Date: May 31, 2019

(65) Prior Publication Data
US 2020/0354548 A1 Nov. 12, 2020

(30) Foreign Application Priority Data
Nov. 24, 2017 (JP) ................. 2017-225810

(51) Int. Cl.
B32B 15/06 (2006.01)
B32B 25/14 (2006.01)
(Continued)

(52) U.S. Cl.
CPC ............... *C08L 9/02* (2013.01); *B32B 15/06* (2013.01); *B32B 25/14* (2013.01); *C08K 5/44* (2013.01);
(Continued)

(58) Field of Classification Search
CPC .. C08L 9/02; C08K 5/44; B32B 15/06; B32B 25/14; B32B 2475/00; B32B 2605/00;
(Continued)

(56) References Cited

U.S. PATENT DOCUMENTS 4,002,594 A * 1/1977 Fetterman ................ C08K 3/36
524/96
4,468,496 A * 8/1984 Takeuchi ............. C08L 23/283
525/235
(Continued)

FOREIGN PATENT DOCUMENTS

CN 104154236 A 11/2014
JP 08-295742 A 11/1996
(Continued)

OTHER PUBLICATIONS

ISR issued in WIPO Patent Application No. PCT/JP2018/038506, dated Dec. 12, 2018, English translation.
(Continued)

Primary Examiner — Craig M Schneider
Assistant Examiner — David R Deal
(74) Attorney, Agent, or Firm — GREENBLUM & BERNSTEIN, P.L.C.

(57) ABSTRACT

An NBR composition for rubber laminated metal having 1 to 3 parts by weight of sulfur and 1 to 15 parts by weight of a disulfide compound such as 4,4'-dithiodimorpholine or dithiodicaprolactam represented by the general formula RN—S—S—NR (wherein RN is a cyclic linking group formed together with the N atom bonded to the S atom), based on 100 parts by weight of NBR. The rubber composition that can improve the protrusion properties of a rubber layer when used for, for example, a gasket or a brake shim material that is a laminated composite metal laminated with another metal plate.

2 Claims, 1 Drawing Sheet

(51) Int. Cl.
*F16D 65/097* (2006.01)
*C08L 9/02* (2006.01)
*C08K 5/44* (2006.01)
*C09K 3/10* (2006.01)
*F16D 65/00* (2006.01)
*F16J 15/10* (2006.01)

(52) U.S. Cl.
CPC ............ *C09K 3/10* (2013.01); *F16D 65/0006* (2013.01); *F16D 65/097* (2013.01); *F16J 15/102* (2013.01); *B32B 2475/00* (2013.01); *B32B 2605/00* (2013.01); *C09K 2003/1084* (2013.01); *C09K 2200/0213* (2013.01); *C09K 2200/0612* (2013.01); *F16D 2200/0021* (2013.01); *F16D 2200/0056* (2013.01); *F16D 2200/0078* (2013.01)

(58) Field of Classification Search
CPC ............... F16D 65/0006; F16D 65/097; F16D 2200/0024; F16D 2200/0056; F16D 2200/0078; F16J 15/102; C09K 2003/1084; C09K 2200/0213; C09K 2200/0612
See application file for complete search history.

(56) References Cited

U.S. PATENT DOCUMENTS

| | | | | |
|---|---|---|---|---|
| 4,872,932 | A * | 10/1989 | Yoshikawa | C23C 28/00 152/565 |
| 5,075,028 | A * | 12/1991 | Hudson | C08K 5/39 252/182.13 |
| 6,465,604 | B2 * | 10/2002 | Lin | C08K 5/378 524/100 |
| 6,646,029 | B1 * | 11/2003 | Lin | C08K 5/37 524/83 |
| 2002/0077424 | A1 * | 6/2002 | Magg | C08L 9/02 525/240 |
| 2003/0181604 | A1 * | 9/2003 | Parg | B29C 33/72 525/540 |
| 2003/0204008 | A1 * | 10/2003 | Campion | C08L 23/283 525/333.1 |
| 2009/0131563 | A1 * | 5/2009 | Wang | C08L 15/005 524/95 |
| 2010/0261004 | A1 * | 10/2010 | Higashira | B32B 15/06 428/327 |
| 2014/0004363 | A1 * | 1/2014 | Yokota | C08K 5/40 524/566 |
| 2014/0171577 | A1 * | 6/2014 | Choi | C08L 9/02 524/493 |
| 2017/0002183 | A1 | 1/2017 | Seo et al. | |

FOREIGN PATENT DOCUMENTS

| | | |
|---|---|---|
| JP | 2003-113366 A | 4/2003 |
| JP | 2003-192834 A | 7/2003 |
| JP | 3856679 B2 | 9/2006 |
| JP | 2006-328335 A | 12/2006 |
| JP | 2008-18707 A | 1/2008 |
| JP | 4228179 B2 | 12/2008 |
| JP | 2009-030808 A | 2/2009 |
| JP | 2009-56632 A | 3/2009 |
| JP | 2012-214542 A | 11/2012 |
| JP | 2014-185758 A | 10/2014 |
| JP | 2016-070347 A | 5/2016 |
| WO | 2014-156666 A1 | 10/2014 |

OTHER PUBLICATIONS

IPRP issued in WIPO Patent Application No. PCT/JP2018/038506, dated May 26, 2020, English translation.

* cited by examiner

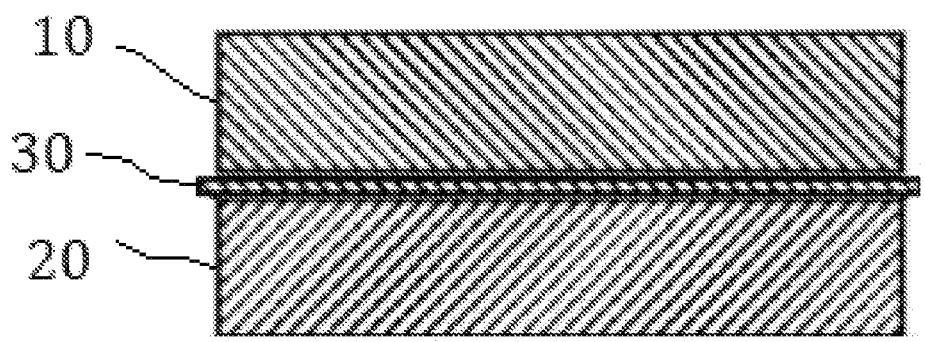

NBR COMPOSITION FOR RUBBER LAMINATED METAL

TECHNICAL FIELD

The present disclosure relates to an NBR composition for rubber laminated metal. More particularly, the present disclosure relates to an NBR composition for rubber laminated metal that forms a rubber layer of a brake shim material etc.

BACKGROUND ART

A rubber laminated metal gasket in which NBR or hydrogenated NBR is laminated on one or both sides of a metal plate is used while being tightened between metals. Therefore, a high compressive stress is applied to the surface of the rubber layer. If the rubber is deformed because it cannot withstand the tightening stress, the intended sealing function cannot be achieved.

In general, in order to improve protrusion properties, a method of increasing hardness by compounding a filler, such as carbon black or silica, is used; however, due to the increase in rubber hardness, the kneading processability is deteriorated and the sealing properties are lowered. Further, even if the compounding amount of sulfur as a vulcanizing agent is increased to enhance the crosslinking density, a significant improvement effect cannot be expected.

Patent Document 1 discloses a heat-resistant NBR composition for gas holder sealing materials, comprising, based on (A) 100 parts by weight of a rubber component comprising 70 wt. % or more of NBR and having an AN content of 25 to 50 wt. %, (B) a vulcanizing agent comprising (a) 0 to 0.5 parts by weight of sulfur and (b) 0.5 to 3 parts by weight of morpholine disulfide, alkylphenol disulfide, or polymer polysulfide, and (C) 0.5 to 5 parts by weight of 4,4'-($\alpha,\alpha$-dimethylbenzyl)diphenylamine antioxidant.

It is described that the compounding amount of sulfur is 0 to 0.5 parts by weight, preferably 0 to 0.3 parts by weight, and that a composition having excellent heat resistance cannot be obtained with a compounding amount of sulfur greater than this range. No sulfur is used in each of the Examples, and Comparative Example 1, in which 2 parts by weight of sulfur is used, shows not only inferior heat resistance, but also a significant increase in hardness.

Further, morpholine disulfide (Barnock®) is used in an amount of 0.5 to 3 parts by weight, preferably 0.5 to 2 parts by weight. It is described that if the compounding amount is greater than this range, premature vulcanization occurs and causes the scorching phenomenon.

Patent Document 2 discloses a vulcanizable rubber composition comprising 0.1 to 1.5 parts by weight, preferably 0.2 to 1 part by weight, more preferably 0.3 to 0.8 parts by weight, of sulfur and/or 4,4'-dithiodimorpholine in terms of sulfur content, based on 100 parts by weight of nitrile group-containing copolymer rubber having two different iodine values.

In the Examples or Comparative Examples thereof, only one of sulfur and 4,4'-dithiodimorpholine is used, and there is no Example that uses both of them.

Patent Document 3 discloses a vehicle air hose using an NBR composition using, as a vulcanization accelerator, 0.5 to 7 parts by mass of thiuram-based compound, 0 to 2.5 parts by mass of 4,4'-dithiodimorpholine, and 2.0 to 7.0 parts by mass of thiazole-based compound, based on 100 parts by mass of NBR, and vulcanized in the presence of 5 to 50 parts by mass of a plasticizer having a MW of 700 to 2000.

It is described that when the compounding amount of 4,4'-dithiodimorpholine exceeds 2.5 parts by mass, the heat resistance becomes inferior, and 0 to 1 part by mass thereof is used in each Example. Further, it is described that the compounding amount of sulfur is preferably 0.1 to 1.0 part by mass, and 0.3 parts by mass thereof is used in each Example.

Patent Documents 4 and 5 each disclose a sealing member constituting a sealing device used for a rolling bearing, the sealing member comprising (A) 40 to 200 parts by weight of carbon black and clay, (B) 0.5 to 3 parts by weight or 0.2 to 5 parts by weight of 4,4'-dithiodimorpholine, and (C) 1 to 10 parts by weight of sulfenamide-based vulcanization accelerator, based on 100 parts by weight of NBR; and the sealing member being a molded product of a rubber composition having a spring hardness A scale of 71 to 75.

It is described that a small amount of sulfur can be added as a crosslinking agent together with 4,4'-dithiodimorpholine; however, only 1 to 2 parts by weight of vulcanizing agent B (4,4'-dithiodimorpholine) is used in each Example, and combination with 0.3 parts by weight of vulcanizing agent A (highly dispersible sulfur) is described only in Example 7 of Cited Document 5.

PRIOR ART DOCUMENT

Patent Document

Patent Document 1: JP-B-3856679
Patent Document 2: JP-A-2003-192834
Patent Document 3: JP-A-2016-70347
Patent Document 4: JP-B-4228179
Patent Document 5: JP-A-2009-30808

OUTLINE OF THE INVENTION

Problem to be Solved by the Invention

An object of the present disclosure is to provide a rubber composition that can improve the protrusion properties of a rubber layer when used for, for example, a gasket or a brake shim material that is a laminated composite metal laminated with another metal plate.

Means for Solving the Problem

The above object of the present disclosure can be achieved by an NBR composition for rubber laminated metal, comprising 1 to 3 parts by weight of sulfur and 1 to 15 parts by weight of a disulfide compound represented by the general formula RN—S—S—NR (wherein RN is a cyclic linking group formed together with the N atom bonded to the S atom), based on 100 parts by weight of NBR.

Effect of the Invention

The improvement of protrusion properties using a disulfide compound does not rely on the compounding of a filler etc., and thus does not involve a hardness increase. Therefore, it is effective in terms of kneading processability and sealing properties.

An increase in rubber hardness has an adverse effect, for example, on the vibration control characteristics of brake shim materials. Therefore, the improvement of protrusion properties using a disulfide compound makes it possible to suppress the increase in hardness, consequently maintaining the vibration control characteristics of brake shim materials.

BRIEF DESCRIPTION OF DRAWINGS

The drawing Figure illustrates a brake shim according to an embodiment of the present invention.

EMBODIMENTS FOR CARRYING OUT THE INVENTION

As the NBR, those having any acrylonitrile (AN) content (e.g., 18 to 48 wt. %) are used.

NBR is used in such a manner that 1 to 3 parts by weight, preferably 1.8 to 2.5 parts by weight, of sulfur and 1 to 15 parts by weight, preferably 1 to 10 parts by weight, of a disulfide compound represented by the general formula RN—S—S—NR are both compounded based on 100 parts by weight of NBR.

If the compounding ratio of sulfur is less than this range, the protrusion properties are insufficient. In contrast, if the compounding ratio of sulfur is greater than this range, the protrusion properties are not improved.

In the disulfide compound represented by the above general formula, RN is a cyclic linking group formed together with the N atom bonded to the S atom. Specific examples include 4,4'-dithiodimorpholine, dithiodicaprolactam, and the like; and 4,4'-dithiodimorpholine is preferably used.

The compounding ratio thereof is 1 to 15 parts by weight, preferably 1 to 10 parts by weight. If the compounding ratio is less than this range, the protrusion properties are not improved. In contrast, if the compounding ratio is greater than this range, the hardness significantly increases, although the protrusion properties are improved.

It is preferable that the NBR composition is further compounded with other sulfur-containing vulcanization accelerators. Examples of sulfur-containing vulcanization accelerators include various vulcanization accelerators, such as guanidine-based, aldehyde-amine-based, aldehyde-ammonia-based, thiazole-based, sulfenamide-based, thiourea-based, thiuram-based, dithiocarbamate-based, and xanthate-based; preferably tetramethylthiuram disulfide, N-cyclohexyl-2-benzothiazylsulfenamide, and the like.

Such a sulfur-containing vulcanization accelerator is generally used at a ratio of about 15 parts by weight or less, preferably 1 to 10 parts by weight, based on 100 parts by weight of NBR.

The NBR composition, which is compounded with, in addition to these components, about 40 to 150 parts by weight of carbon black, heavy calcium carbonate, acid acceptor, lubricant, and other compounding agents, is used for a rubber laminated metal plate in which a vulcanizate layer of the NBR composition is laminated on a metal plate.

The metallic plate for use includes stainless steel plate, mild steel plate, zinc-plated steel plate, SPCC steel plate, copper plate, magnesium plate, aluminum plate, aluminum die cast plate, etc. The metallic plate is used generally in a defatted state, and the metal surface is, if necessary, roughened by Shot blast, Scotch bride, Hair line, Dull Finish, etc. The plate thickness is generally about 0.1 to about 1 mm for use as seal materials.

A primer layer is preferably formed on such a metal plate. The primer layer is expected to greatly improve the heat resistance and water resistance of the rubber adhesive layer of the rubber metal laminate. In particular, it is desirable to form the primer layer when the rubber laminated metal plate is used as a break shim material, which is a laminated composite metal laminated with another metal plate, preferably a steel plate. The drawing Figure shows rubber layer (30) laminated with a metal plate (10) to form a laminated composite metal, which is itself laminated with another metal plate (20).

The primer layer includes, for example, inorganic films such as zinc phosphate films, iron phosphate films, coating-type chromate films, films of compounds of metals such as vanadium, zirconium, aluminum, silicon, titanium, molybdenum, tungsten, manganese, zinc, cerium, particularly oxides of these metals, and organic films such as silanes, phenol resin, epoxy resin, polyurethane, or the like. Commercially available general chemical solutions or known techniques can be used as they are.

The primer comprising the afore-mentioned components is prepared as a solution of an organic solvent, for example, alcohols such as methanol, ethanol, isopropyl alcohol; ketones such as acetone, methyl ethyl ketone; or the like, so as to have a solid matter concentration of about 0.2 to 5 wt. %, and is also prepared as an aqueous solution, so long as the liquid stability can be maintained.

The obtained primer solution is coated to the metal plate by spraying or dipping, or using a brush, a roll coater, or the like, with a coating weight of about 50 to 200 mg/m$^2$ per side, and dried at room temperature or by hot air, followed by baking treatment at about 100 to 250° C. for about 0.5 to 20 minutes, thereby forming a primer layer.

In addition, as the adhesive, commercially available general adhesives for forming a coating film of various resin such as silane, phenol resin, epoxy resin, polyurethane can be used as they are. Furthermore, an adhesive comprising two kinds of phenol resin, i.e. novolak type phenol resin and resol type phenol resin, and unvulcanized nitrile rubber can be used.

As the novolak type phenol resin, resin prepared by condensation reaction of phenol having two or three substitutable nuclear hydrogen atoms at o- and/or p-positions relative to the phenolic hydroxyl group of phenol, p-cresol, m-cresol, p-t-butyl phenol, etc. or a mixture thereof with formaldehyde in the presence of an acid catalyst such as oxalic acid, hydrochloric acid, maleic acid, and having a melting point of 80°-150° C., and preferably one prepared from m-cresol and formaldehyde and having a melting point of 120° C. or more is used.

As the resol type phenol resin, resin prepared by condensation reaction of phenol having two or three substitutable nuclear hydrogen atoms at o- and/or p-positions relative to the phenolic hydroxyl group of phenol, p-cresol, m-cresol, p-t-butyl phenol, etc., or a mixture thereof with formaldehyde in the presence of an alkali catalyst such as ammonia, an alkali metal hydroxide, magnesium hydroxide is used.

The adhesive containing the afore-mentioned components is dissolved in a single organic solvent, for example, ketones such as methyl ethyl ketone, methyl isobutyl ketone; aromatic hydrocarbons such as toluene, xylene, or the like, or in a mixture thereof, and used as a solution state.

The afore-mentioned components that form a preferable adhesive, are used in proportions of 10-1,000 parts by weight, preferably 60-400 parts by weight, of the resol type phenol resin, on the basis of 100 parts by weight of the novolak type phenol resin. Each of these components is dissolved in an organic solvent, and mixed and stirred to make a total component concentration of about 3 to 10 wt. %, thereby preparing a vulcanizable adhesive. When the resol type phenol resin is used in a proportion greater than this range, the adhesiveness of nitrile rubber material is lowered, whereas in a proportion less than this range the adhesiveness to the metal surface or primer layer is lowered, which is not preferable. The adhesive is prepared from these components by dissolving a predetermined amount of each component individually in an organic solvent, and mixed and stirred.

The formation of an adhesive layer on the metal plate is performed by coating the above-mentioned adhesive solution onto the metal plate on which a primer layer is preferably formed, and then drying it by air at room temperature or hot air, followed by baking at about 100 to 250° C. for about 5 to 30 minutes. The coating thickness of the adhesive layer after drying is preferably about 0.5 to 5 μm.

The adhesive layer can be not only in a single layer structure, but also in a multi-layer structure. For example, a phenolic adhesive layer containing an organometallic compound is formed on the primer layer, and then phenolic adhesive layer is provided thereon to form the adhesive layers in multiple steps, and then a rubber layer is formed thereon. Although such a structure invites increase of coating steps for the adhesive layers, it can make the adhesiveness between the primer layer and the rubber layer stronger.

On the adhesive layer, a nitrile rubber coating agent is coated to a thickness of about 10 to 200 μm, followed by drying by air at room temperature or hot air, after which vulcanization is performed at about 160 to 250° C. for about 0.5 to 30 minutes. For the obtained rubber metal laminate, a resin-based or graphite-based coating agent may be coated onto the rubber layer for the purpose of preventing rubber adhesion.

The obtained rubber laminated metal is used, for example, as a gasket or a brake shim material further laminated with another metal plate, such as a steel plate.

EXAMPLES

The following describes the present disclosure with reference to Examples.

Example 1

| | |
|---|---|
| NBR (NIPOL DN3350, produced by Zeon Corporation) | 100 parts by weight |
| MT Carbon black | 80 parts by weight |
| Heavy calcium carbonate | 50 parts by weight |
| Zinc oxide | 5 parts by weight |
| Stearic acid | 1 part by weight |
| Antioxidant CD [4,4'-(α,α-dimethylbenzyl)diphenylamine] | 2 parts by weight |
| Vulcanization accelerator TT (tetramethylthiuram disulfide) | 3 parts by weight |
| Vulcanization accelerator CZ (N-cyclohexyl-2-benzothiazyl sulfenamide) | 3 parts by weight |
| Colloidal sulfur | 2 parts by weight |
| 4,4'-dithiodimorpholine | 1 part by weight |

Each of the above components was kneaded with a kneader and an open roll, and the kneaded product (composition) was vulcanized at 175° C. for 5 minutes to produce a rubber sheet having a thickness of 2 mm. The hardness of the rubber sheet was measured according to JIS K6253.

A compression test evaluation sample was produced as follows.

On an SPCC steel plate (thickness: 0.6 mm) surface-treated with zinc phosphate, a phenol resin diluted with an organic solvent, such as methyl ethyl ketone or methanol, to a solid matter concentration of 5 wt. % was coated onto the SPCC steel plate so that the coating thickness after drying was 3 μm, followed by drying at room temperature. The phenol resin is not particularly limited as long as it can be bonded by vulcanization to NBR. For example, a commercially available product Thixon 715 (produced by Dow Chemical Company), or the like is used.

The above NBR compound was dissolved in an organic solvent, and coated onto the phenol resin-coated SPCC steel plate so that the coating thickness after drying was 80 μm.

In this case, methyl ethyl ketone, ethyl acetate, toluene, or the like was used as the organic solvent.

The SPCC steel plate coated with NBR in this manner was vulcanized in an oven at 200° C. for 3 minutes to form a rubber laminated metal plate. Further, an anti-adhesion layer was coated onto the surface of the rubber layer, if necessary.

The compression test was evaluated as follows.

A doughnut-like and projection-shaped metal fitting was compressed to the rubber surface of the rubber laminated metal plate at 150° C. for 10 minutes at a predetermined pressure (120 MPa). Then, the state of the rubber layer was evaluated according to the following criteria.

Evaluation 5 points: No metal exposure and almost no rubber flow

Evaluation 4 points: No metal exposure and a little rubber flow

Evaluation 3 points: Not a less rubber flow, but no metal exposure

Evaluation 2 points: Large rubber flow, but less metal exposure

Evaluation 1 point: Large rubber flow and large metal exposure Regarding the protrusion properties, 5 and 4 points were evaluated as ◯, 3 points as Δ, and 2 and 1 points as x.

Example 2

In Example 1, the amount of 4,4'-dithiodimorpholine was changed to 4 parts by weight.

Example 3

In Example 1, the amount of 4,4'-dithiodimorpholine was changed to 8 parts by weight.

Example 4

In Example 1, the amount of 4,4'-dithiodimorpholine was changed to 12 parts by weight.

Example 5

In Example 1, the amount of 4,4'-dithiodimorpholine was changed to 15 parts by weight.

Comparative Example 1

In Example 1, the amount of 4,4'-dithiodimorpholine was changed to 20 parts by weight.

Comparative Example 2

In Example 1, the amount of 4,4'-dithiodimorpholine was changed to 0.5 parts by weight.

Comparative Example 3

In Example 1, 4,4'-dithiodimorpholine was not used.

Comparative Example 4

In Example 1, 4,4'-dithiodimorpholine was not used, and the amount of the colloidal sulfur was changed to 3 parts by weight.

Comparative Example 5

In Example 1, 4,4'-dithiodimorpholine was not used, and the amount of the colloidal sulfur was changed to 4 parts by weight.

Comparative Example 6

In Example 1, 4,4'-dithiodimorpholine was not used, and the amount of the MT carbon black was changed to 130 parts by weight.

Comparative Example 7

In Example 3, colloidal sulfur was not used.

Table 1 below shows the results obtained in the above Examples 1 to 5 and Comparative Examples 1 to 7. Regarding the hardness increase from an additive-free product, the hardness increase compared with a 4,4'-dithiodimorpholine-free product (Comparative Example 3) was calculated. A hardness difference of 0 to +1 pts was evaluated as ○, +2 pts as Δ, and +3 pts or more as x.

Example 6

| | |
|---|---|
| NBR (JSR N237, produced by JSR) | 100 parts by weight |
| MT Carbon black | 150 parts by weight |
| Zinc oxide | 5 parts by weight |
| Stearic acid | 1 part by weight |
| Antioxidant CD | 2 parts by weight |
| Vulcanization accelerator TT | 3 parts by weight |
| Vulcanization accelerator CZ | 3 parts by weight |
| Colloidal sulfur | 1.5 parts by weight |
| Dithiodicaprolactam | 3 parts by weight |

Using each of the above components, the production of a rubber sheet, measurement of hardness, and compression test were performed in the same manner as in Example 1. In addition, the hardness increase after the compression test was compared with a dithiodicaprolactam-free product (Comparative Example 9).

Example 7

In Example 6, the amount of dithiodicaprolactam was changed to 15 parts by weight.

Comparative Example 7

In Example 6, the amount of dithiodicaprolactam was changed to 20 parts by weight.

TABLE 1

| Example | Hardness (Duro A) | Hardness increase from an additive-free product | Evaluation | Compression test | Evaluation |
|---|---|---|---|---|---|
| Example 1 | 83 | 0 | ○ | 4 points | ○ |
| Example 2 | 83 | 0 | ○ | 4 points | ○ |
| Example 3 | 84 | +1 | ○ | 4 points | ○ |
| Example 4 | 85 | +2 | Δ | 5 points | ○ |
| Example 5 | 85 | +2 | Δ | 5 points | ○ |
| Comparative Example 1 | >86 | >+3 | X | 5 points | ○ |
| Comparative Example 2 | 83 | 0 | ○ | 3 points | Δ |
| Comparative Example 3 | 83 | — | ○ | 1 point | X |
| Comparative Example 4 | 83 | 0 | ○ | 1 point | X |
| Comparative Example 5 | 83 | 0 | ○ | 1 point | X |
| Comparative Example 6 | 90 | +7 | X | 4 points | ○ |
| Comparative Example 7 | 75 | −8 | ○ | 1 point | X |

Comparative Example 8

In Example 6, the amount of dithiodicaprolactam was changed to 0.5 parts by weight.

Comparative Example 9

In Example 6, dithiodicaprolactam was not used.

Table 2 below shows the results obtained in the above Examples 6 to 7 and Comparative Examples 7 to 9.

TABLE 2

| Example | Hardness (Duro A) | Hardness increase from an additive-free product | Evaluation | Compression test | Evaluation |
| --- | --- | --- | --- | --- | --- |
| Example 6 | 89 | +1 | ○ | 4 points | ○ |
| Example 7 | 90 | +2 | Δ | 5 points | ○ |
| Comparative Example 7 | >91 | >+3 | X | 5 points | ○ |
| Comparative Example 8 | 88 | 0 | ○ | 3 points | Δ |
| Comparative Example 9 | 88 | — | ○ | 1 point | X |

The invention claimed is:

1. A brake shim material, comprising:
   a vulcanizate layer of NBR composition laminated with a first metal plate and another metal plate;
   wherein the NBR composition comprises:
   1 to 3 parts by weight of sulfur and
   1 to 15 parts by weight of 4,4'-dithiodimorpholine or dithiodicaprolactam, based on 100 parts by weight of the NBR.

2. The brake shim material according to claim 1, wherein the NBR composition further comprises 15 parts by weight or less of other sulfur-containing vulcanization accelerators.

\* \* \* \* \*